May 12, 1970

C. W. BEAL 3,511,374

SCREENING DEVICE

Filed Nov. 1, 1968

INVENTOR.
CLIFFORD W. BEAL
BY Eckhoff and Hoppe
ATTORNEYS

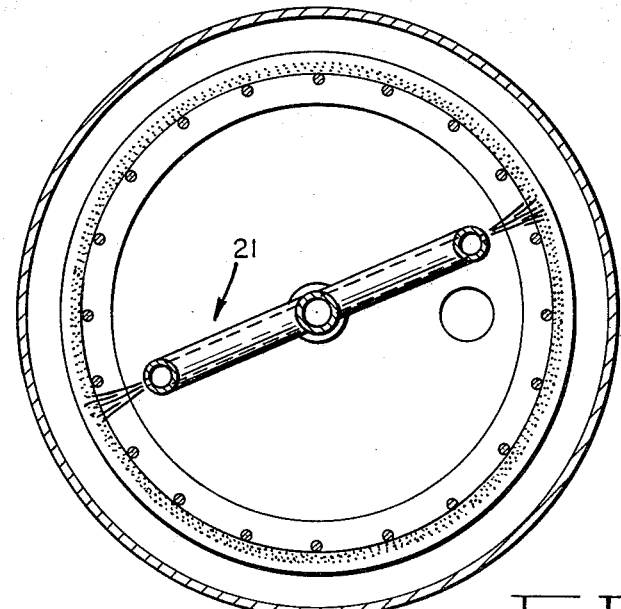
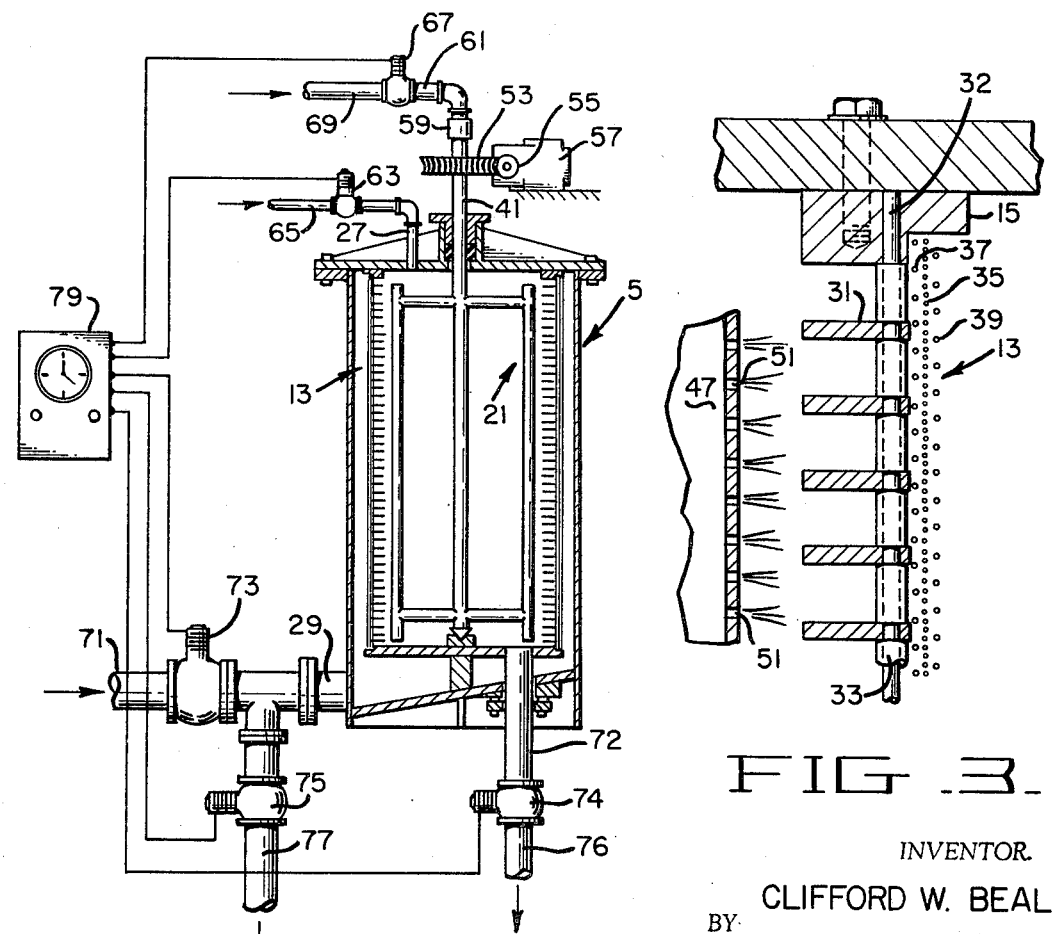

United States Patent Office 3,511,374
Patented May 12, 1970

3,511,374
SCREENING DEVICE
Clifford W. Beal, San Francisco, Calif., assignor to California and Hawaiian Sugar Company, a corporation of California
Filed Nov. 1, 1968, Ser. No. 772,537
Int. Cl. B07b 1/18, 1/50
U.S. Cl. 209—258                    3 Claims

ABSTRACT OF THE DISCLOSURE

A pressure screen is provided for removing oversize particles from a fluid. A cylinder screen is employed with flow to the center of the cylinder from the outside. After the screen blinds and the throughput decreases to an undesirable rate, the fluid is emptied from the device and a high speed jet is directed at the screen from the inside which flushes off the solids, leaving a clean screen ready for further screening. Preferably the device has an automatic cleaning cycle.

SUMMARY OF THE INVENTION

In the past it has been common to provide screens and filters having a back flushing action. In some instances, a back flush shoe is provided to direct fluid at the screen. Normally a low rate of flow is provided which gives a poor cleaning action.

In accordance with the present invention, a cylindrical screen is provided which is supported on an open grillwork with the screening taking place by passing the fluid from the outside of the cylinder to the inside. Within the cylinder, a series of jets is provided on a rotating frame. When the throughput through the screen is reduced to an unsatisfactory level, the flow is stopped and a waste valve opened and the fluid both inside and outside of the screen is forced out of the device by compressed air. Liquid under high pressure is then supplied to the rotating jet member inside the screen and the high pressure jets force the clogged material from the screen. As soon as the screen is cleared, the waste valve is closed and the inlet and outlet valves opened so that screening can be resumed for a repetition of the cycle.

BRIEF DESCRIPTION OF THE DRAWING

In the drawing for a part of this application:
FIG. 2 is a plan sectional view on the line 2—2 of FIG. 1.
FIG. 3 is an enlarged sectional view of the screen and jet.
FIG. 4 is a sectional view of the device of the present invention showing particularly the auxiliary equipment which is employed to make the screening and cleaning operations automatic.

DESCRIPTION OF THE PREFERRED EMBODIMENTS

Figure 1:
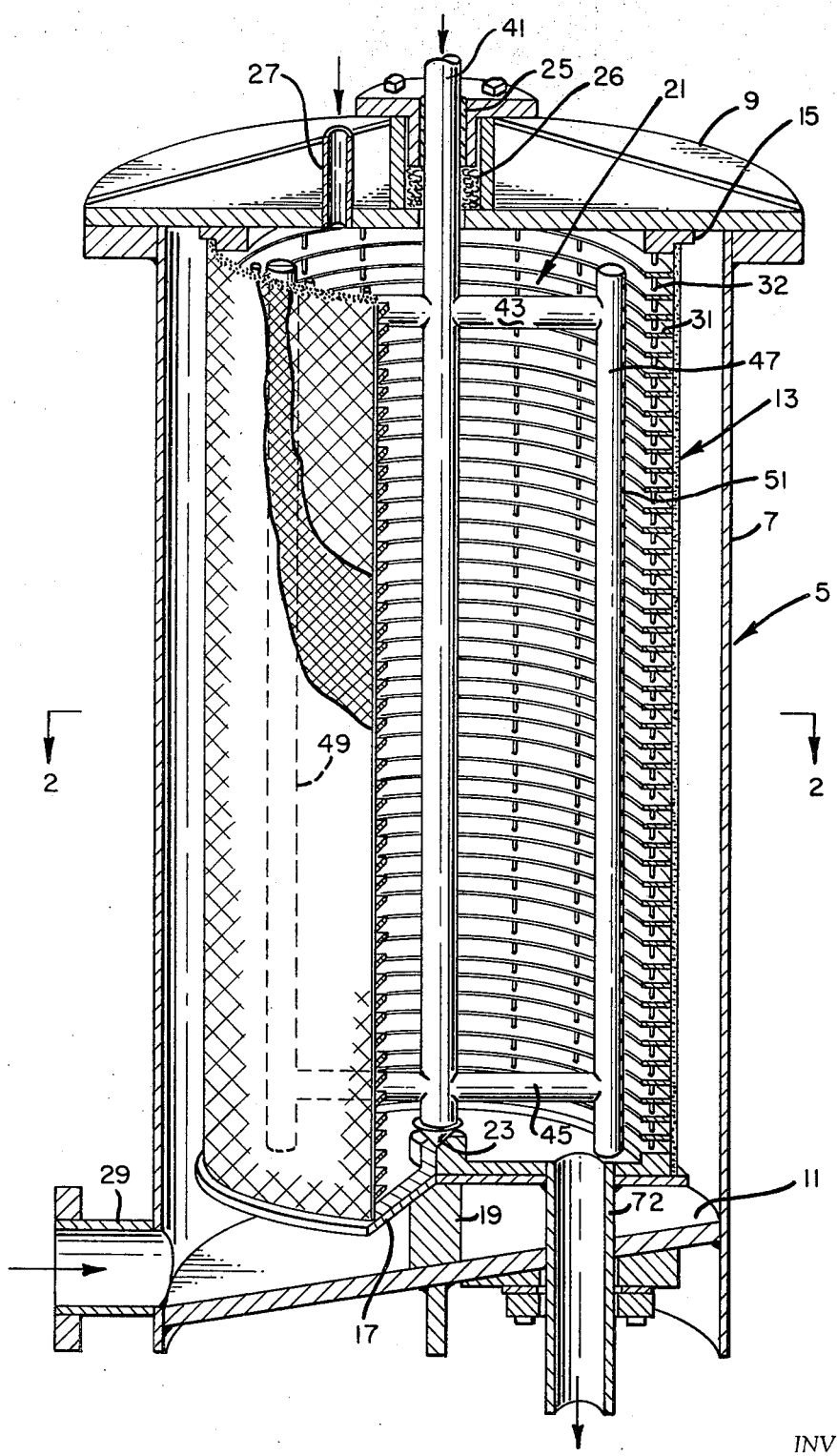
FIG. 1 is a side view in section of a screening device embodying the present invention.

Referring now to the drawings by reference characters, there is shown a screening device generally designated 5 having a cylindrical side wall forming a shell 7, a top 9 and a sloping bottom 11. Mounted within the device is a cylindrical screen element generally designated 13 which is hereinafter described in detail. The screen element 13 is mounted on the top 9 by means of a flange 15 so that there is substantially a fluid tight seal between the screen and the top. The bottom of the screen is similarly mounted with a fluid tight connection to a bottom plate 17 which is elevated above the bottom 11 of the screening device by means of support 19, although it is obvious that the screen might be mounted directly on the bottom 11 without changing the operation of the device.

A rotating jet member generally designated 21, hereinafter described in detail, is mounted for rotation by means of a bottom thrust bearing 23, suitably a needle bearing, while at the top a bearing 25 is employed with a packing gland 26. An air inlet 27 is provided in the top 9 and near the bottom of the shell 7 a connection 29 is provided which serves both as an inlet for the fluid to be screened as well as an outlet for waste during the cleaning cycle. It will be noted that the floor 11 slopes toward the inlet 29 so that substantially complete drainage can be achieved. It is obvious that separate inlets and outlets could be provided for the shell 7 in which case the inlet might be located at a higher point than the outlet. Pipe 72 serves as an outlet for the space inside the screen 13, i.e. the clean fluid which has passed through the screen.

The screen, which has been generally designated 13 is made of a composite structure which includes an inner grill work 31 of relatively heavy metal to resist inward pressure. The grill work 31 is mounted on the rods 32 which extend between the top 9 and bottom plate 17. The screen itself consists of a relatively fine screen 35 with relatively coarse screens 37 and 39 on either side thereon. In one practical embodiment of the device, the grill member 31 comprised strips spaced on one inch centers, the inner screen 35 was 150 mesh and the inner and outer screens 37 and 39 were 8 mesh. It will be seen that with this structure, the screen 35, which is the actual effective screening agent, is supported mechanically from either internal or external pressure by the relatively coarse screens 37 and 39 and additionally is supported against external pressure by the grill work 31.

The jet member 21 includes a central pipe 41 which is connected to the cross pipe members 43 and 45 which in turn are connected to the pipes 47 and 49 which are parallel to and spaced slightly from grid 31. Pipes 47 and 49 have a series of small holes 51 therein so that when fluid is introduced under pressure through the pipe 41 high speed jets of fluid are produced through the opening 51 as is best seen in FIG. 3. Cleaning is enhanced by having the jets on pipes 47 and 49 staggered with respect to each other.

Pipe 41 has a pinion 53 attached thereto which is driven by worm 55 on a motor with a reducer 57. A speed of 1 r.p.m. is suitable. A rotating joint 59 is provided so that fluid under pressure can be introduced through line 61, through the joint 59 and into the pipe 41 and ultimately out through the jets 51.

The pipe 27 is connected through a solenoid valve 63 leading to a source of air, not illustrated through pipe 65. Pipe 61 is connected through a solenoid valve 67 to a source of high pressure fluid, not illustrated, through line 69.

Fluid to be screened is introduced through line 71 through a solenoid valve 73 to the opening 29. At the same time, the opening 29 is in fluid communication with a solenoid valve 75 leading to a drain line 77. Pipe 72 is connected through solenoid valve 74 to the outlet 76. The five solenoid valves 63, 67, 73 and 75 are connected by suitable wiring to a timeclock 79.

In one practical embodiment of the invention, the screen was used to remove bagasse and other large particles of foreign matter from a relatively crude sugar solution. The objective was to remove only the relatively large particles by a screening operation and the device was not used as a filter in the usual sense of the word. The device was operated on a three and a half minute time cycle although cycles as short as two minutes are practical or as long as five minutes or even longer are likewise practical, depending upon the degree of contamination of the fluid being screened. In a typical operation, the cycle starts with valves 63, 67 and 75 closed and valves 73 and 74 open. In this position, the material to be screened enters line 71, passes around the outside of the screen 13 and then into the center of the chamber and out through lines 72 and 76. As soon as the screening operation has gone on for such a time that the screen becomes clogged, valves 73 and 74 are closed while valve 75 and valve 63 are opened. This first blow down period causes the fluid within the shell 7 to be discharged through the line 77 and as soon as the shell is empty, water under pressure is introduced through line 41 by opening valve 67. At this time, the high pressure jets revolve squirting water through the grill 31 and the screen 13, cleaning the foreign matter off the surface of the screen, whereupon it is discharged through line 77. As soon as the screen is clean, valve 67 is closed and valve 63 is opened for a second blow down period. Shortly thereafter, as soon as shell 7 is empty, valves 75 and 63 are closed and valves 73 and 74 are opened for a repetition of the cycle. In a typical operation, the filtration period was 3 minutes, the first blow down 10 seconds, the spray period was 4 to 8 seconds, the second blow down period 10 seconds and an idle time of 4 seconds was allowed before the cycle was repeated.

It will be noted, that no provision has been made for starting or stopping the motor 57. In one practical embodiment of the device, it is allowed to run at all times since it consumes little power and does not interfere with the screening operation. Therefore, it is ordinarily not worthwhile to provide automatic control means for this motor and is allowed to run at all times. However, it is obvious it serves no function except during the cleaning opeartion and might be tied in with the electric line which controls valve 67 so that the motor would operate only during that period when the cleaning operation is taking place.

The device of the present invention was used in the sugar refinery in place of a vibrating screen and has proved much more effective than the usual vibrating screen. It occupies little space, has only one moving part and is completely automatic in its operation. Since the screen itself does not vibrate or move, the wires do not break from metal fatigue and the screens have a long life dependent only upon the amount of abrasive wear of the material being screened. Further, it has a long period of screening before true filtration starts, during which time the screen fluid contains less and less solids as the screening continues. Thus, the screened fluid contains less solid material than fluid screened through conventional vibrating screens or other continuously cleaned screens.

The volume of cleaning fluid required is very small compared to the volume being screened because of the forceful jet cleaning achieved.

It will be obvious to those skilled in the art that many variations can be made in the exact structure shown without departing from the spirit of this invention. For instance, although two jet arms are illustrated, it is obvious that a larger or smaller number of arms might be employed. However, two arms represent a good compromise between low cost and fast action. Although a time clock arrangement has been shown for automatically sequencing the screen, it is obvious that other systems might be used such as one sensing a pressure drop across the screen wherein the cleaning cycle is automatically started when the pressure drop becomes excessive. This is particularly advantageous when screening fluid having a variable amount of contamination. Pressure blow down has been shown but gravity or suction could be used.

What is claimed is:
1. A screen device for removing coarse particles from a fluid comprising in combination:
(a) a fluid tight housing,
(b) a cylindrical screen mounted within said housing, said cylindrical screen being sealed at its ends whereby the only fluid communication is through said screen,
(c) said screen thereby defining a first chamber consisting of the space between the housing and the screen and a second chamber within said screen,
(d) means for introducing a fluid to be screened within said first chamber,
(e) means for removing screened fluid from said second chamber,
(f) a rotating arm within said screen, said arm being hollow and having a plurality of jet openings extending outwardly toward said screen,
(g) means to cut off the flow of the fluid to be screened to said first chamber,
(h) means for introducing gaseous media under pressure into said fluid tight housing for forcing both the fluid to be screened from the first chamber and the screened fluid from the second chamber to empty said chambers, and
(i) means for discharging fluid under pressure through said jet openings to dislodge material caught on said screen while said first and second chambers are substantially empty.

2. The structure of claim 1 wherein the screen comprises an inner grill member and an outer screening member, said outer screening member having a pair of relatively coarse screens with a fine screen between the coarse screens.

3. A screen device for removing coarse particles from a fluid comprising in combination:
(a) a fluid tight housing,
(b) a cylindrical screen mounted within said housing, said cylindrical screen being sealed at its ends whereby the only fluid communication is through said screen,
(c) said screen thereby defining a first chamber consisting of the space between the housing and the screen and a second chamber within said screen
(d) means for introducing a fluid to be screened within said first chamber,
(e) means for removing screened fluid from said second chamber,
(f) a rotating arm within said screen, said arm being hollow and having a plurality of jet openings extending outwardly toward said screen,
(g) means to cut off the flow of the fluid to be screened to said first chamber,
(h) means for emptying the contents of both the first chamber and the second chamber,
(i) means for discharging fluid under pressure through said jet openings to dislodge material caught on said screen while said first and second chambers are substantially empty, and
(j) a time clock with means connected between said clock and each of the recited means for introducing and removing fluid whereby said screen device alternates between a screening operation and a cleaning operation automatically on a cyclic basis.

References Cited
UNITED STATES PATENTS

| 851,388 | 4/1907 | Wallace | 210—411 |
|---|---|---|---|
| 1,439,706 | 12/1922 | Kneuper | 210—415 X |
| 2,046,770 | 7/1936 | Coberly | 210—138 X |
| 2,796,809 | 6/1957 | Sprau | 209—306 X |
| 2,835,390 | 5/1958 | King | 210—411 |
| 2,862,622 | 12/1958 | Kircher | 210—411 X |
| 3,034,431 | 7/1962 | Dudley | 210—138 X |
| 3,168,467 | 2/1965 | Dreyer | 210—415 |

FRANK W. LUTTER, Primary Examiner

U.S. Cl. X.R.

209—273, 305, 370, 380; 210—139, 415